US012608923B2

(12) United States Patent
Boom et al.

(10) Patent No.: US 12,608,923 B2
(45) Date of Patent: Apr. 21, 2026

(54) METHOD FOR TRAINING A NEURAL NETWORK

(71) Applicant: Cyclomedia Technology B.V., Zaltbommel (NL)

(72) Inventors: Bastiaan Johannes Boom, Zaltbommel (NL); Julien Adrianus Vijverberg, Zaltbommel (NL); Bart Johannes Beers, Zaltbommel (NL)

(73) Assignee: Cyclomedia Technology B.V., Zaltbommel (NL)

( * ) Notice: Subject to any disclaimer, the term of this patent is extended or adjusted under 35 U.S.C. 154(b) by 275 days.

(21) Appl. No.: 18/565,322

(22) PCT Filed: May 31, 2022

(86) PCT No.: PCT/NL2022/050297
§ 371 (c)(1),
(2) Date: Nov. 29, 2023

(87) PCT Pub. No.: WO2022/255866
PCT Pub. Date: Dec. 8, 2022

(65) Prior Publication Data
US 2024/0371139 A1 Nov. 7, 2024

(30) Foreign Application Priority Data
Jun. 1, 2021 (NL) ...................................... 2028357

(51) Int. Cl.
*G06V 10/774* (2022.01)
*G06T 7/33* (2017.01)
(Continued)

(52) U.S. Cl.
CPC ............ *G06V 10/774* (2022.01); *G06T 7/337* (2017.01); *G06V 10/14* (2022.01); *G06V 10/28* (2022.01);
(Continued)

(58) Field of Classification Search
CPC ...... G06V 10/774; G06V 10/14; G06V 10/28; G06V 10/32; G06V 10/82; G06V 20/56;
(Continued)

(56) References Cited

U.S. PATENT DOCUMENTS 10,832,062 B1 * 11/2020 Evans ................... G06V 10/761
2004/0164851 A1 * 8/2004 Crawshaw ............. B60Q 9/008
340/435

(Continued)

FOREIGN PATENT DOCUMENTS

KR 102242939 B1 4/2021

OTHER PUBLICATIONS

Park et al., "Vehicular Multi-Camera Sensor System for Automated Visual Inspection of Electric Power Distribution Equipment", 2019 IEEE/RSJ International Conference on Intelligent Robots and Systems (IROS), 2019, pp. 281-288.

*Primary Examiner* — Xuemei G Chen
(74) *Attorney, Agent, or Firm* — The Webb Law Firm

(57) ABSTRACT

The present invention relates to a method for training a neural network. The present invention further relates to a method for training a neural network for recognizing an object, to a method for detecting an object in an image using a neural network, and to a method for detecting an object in an image. The present invention proposes to use a first and second camera that are mounted on a vehicle and that have the same orientation. The first and second cameras are different cameras. By triggering the first and second camera such that at a time of recording an image, the cameras are at substantially the same position, a dataset is obtained that is used for training a neural network for transforming an image recorded by the first camera into an image that would have been recorded by the second camera.

15 Claims, 4 Drawing Sheets

(51) Int. Cl.

| | |
|---|---|
| *G06V 10/14* | (2022.01) |
| *G06V 10/28* | (2022.01) |
| *G06V 10/32* | (2022.01) |
| *G06V 10/82* | (2022.01) |
| *G06V 20/56* | (2022.01) |

(52) U.S. Cl.
CPC .............. *G06V 10/32* (2022.01); *G06V 10/82* (2022.01); *G06V 20/56* (2022.01); *G06T 2207/20081* (2013.01); *G06T 2207/20084* (2013.01); *G06T 2207/20132* (2013.01); *G06T 2207/30252* (2013.01)

(58) Field of Classification Search
CPC ................... G06V 10/24; G06T 7/337; G06T 2207/20081; G06T 2207/20084; G06T 2207/20132; G06T 2207/30252
See application file for complete search history.

(56) References Cited

U.S. PATENT DOCUMENTS

| | | | | |
|---|---|---|---|---|
| 2007/0153341 | A1* | 7/2007 | Kang ..................... | H04N 1/58 358/529 |
| 2008/0075391 | A1* | 3/2008 | Van Den Heuvel ... | G03B 37/04 382/284 |
| 2009/0201361 | A1* | 8/2009 | Lyon ..................... | H04N 25/531 348/148 |
| 2017/0124404 | A1* | 5/2017 | Yamane ............... | G06V 40/103 |
| 2017/0185851 | A1 | 6/2017 | Jeromin et al. | |
| 2018/0342044 | A1 | 11/2018 | Lutz et al. | |
| 2019/0179327 | A1 | 6/2019 | Martin et al. | |
| 2019/0384303 | A1 | 12/2019 | Muller et al. | |
| 2020/0005489 | A1* | 1/2020 | Kroeger ................... | G06T 7/85 |
| 2020/0086791 | A1* | 3/2020 | Hardy ................... | G06T 3/4038 |
| 2020/0372282 | A1 | 11/2020 | Chang et al. | |
| 2021/0377437 | A1* | 12/2021 | Ko ......................... | H04N 23/90 |
| 2021/0396537 | A1* | 12/2021 | Lee ...................... | G06T 1/0007 |
| 2022/0006939 | A1* | 1/2022 | Lee ...................... | G01B 11/026 |
| 2022/0076037 | A1* | 3/2022 | Hochman ............. | G05D 1/249 |
| 2022/0084229 | A1* | 3/2022 | Guizilini ................... | G06T 3/18 |
| 2022/0189054 | A1* | 6/2022 | Kaiser .................. | G06V 20/582 |
| 2022/0198714 | A1* | 6/2022 | del Pero ................... | G06T 7/85 |
| 2022/0266854 | A1* | 8/2022 | Hüger .................... | G06F 18/214 |
| 2022/0292800 | A1* | 9/2022 | Blais-Morin ........ | G06V 20/584 |
| 2022/0366706 | A1* | 11/2022 | Stein ........................ | G06T 7/50 |
| 2022/0375341 | A1* | 11/2022 | Wang ........................ | G06T 7/70 |
| 2024/0174260 | A1* | 5/2024 | Krökel ............... | B60W 60/001 |

* cited by examiner

METHOD FOR TRAINING A NEURAL NETWORK

CROSS-REFERENCE TO RELATED APPLICATIONS

This application is the United States national phase of International Patent Application No. PCT/NL2022/050297 filed May 31, 2022, and claims priority to The Netherlands Patent Application No. 2028357 filed Jun. 1, 2021, the disclosures of which are hereby incorporated by reference in their entireties.

BACKGROUND OF THE INVENTION

Field of the Invention

The present invention relates to a method for training a neural network. The present invention further relates to a method for training a neural network for recognizing an object in an image, to a method for detecting an object in an image using a neural network, and to a method for detecting an object in an image.

Description of Related Art

If two cameras, e.g. a first camera and a second camera, from different manufacturers are used for recording an image of a same scene, different colors may typically be observed in the recorded images. In the case of professional applications, this is not always a desired behavior. In the case of machine learning algorithms, if those algorithms learn on images captured by the first camera, the performance of that algorithm on images from the second camera is likely to be worse. An existing solution to address this problem is to learn a color transformation between both cameras. The challenge for this approach is to create large scale datasets in order to learn the required transformation.

It should be noted that the abovementioned problem is not limited to inconsistencies in color information. For example, using cameras that differ in at least one property among the group of properties consisting of maximum pixel resolution, color gamut, use of color or polarization filters, camera manufacturer, camera model, and exposure settings, and the like may also result in the problem that a neural network trained using images obtained with the first camera may display degraded performance when operating on images obtained with the second camera.

US2018342044 A1 discloses a resolution enhancement technique. An apparatus is described that receives first image data at a first resolution, and second image data at a resolution less than the first resolution. The second image data may be scaled to the first resolution and compared to the first image data. Application of a neural network may scale the first image data to a resolution higher than the first resolution. The application of the neural network may incorporate signals based on the scaled second image data. The signals may include information obtained by comparing the scaled second image data to the resolution of the first image data.

US 2020/372282 A1 discloses a system and method for adapting images from different cameras so that a single trained classifier or an analyzer may be used. The classifier or analyzer operates on images that include a particular color distribution or characteristic. A generative network is used to adapt images from other cameras to have a similar color distribution or characteristic for use by the classifier or analyzer. A generative adversarial process is used to train the generative network.

KR 102242939 B1 provides a camera device that can more efficiently generate high-resolution images. The camera device comprises an image sensor generating first Bayer data having a first resolution, and a processor outputting second Bayer data having a second resolution higher than the first resolution by performing deep learning based on the first Bayer data.

US 2017/185851 A1 discloses a system that includes one or more processors, and a memory including instructions, which when executed by the one or more processors, cause the one or more processors to perform a method. The method includes receiving first image data from a first image sensor mounted on a vehicle and second image data from a second image sensor mounted on the vehicle, the vehicle including an element configured to open into a space external to the vehicle. The method further includes generating a depth map from a comparison of the first image data and the second image data, the depth map including an object. In accordance with a determination that the object, in the depth map, is within the space into which the element is configured to open, it is determined that the object will interfere with opening of the element into the space. Furthermore, in accordance with a determination that the object, in the depth map, is not within the space into which the element is configured to open, it is determined that the object will not interfere with opening of the element into the space.

In the paper "Vehicular Multi-Camera Sensor System for Automated Visual Inspection of Electric Power Distribution Equipment", by Park Jinsun et al, IEEE/RSJ International conference on intelligent robots and systems (IROS), IEEE, Mar. 11, 2019, pp. 281-288, a multi-camera sensor system is disclosed for automated visual inspection from a moving vehicle.

SUMMARY OF THE INVENTION

It is an object of the present invention to provide a convenient manner to train a neural network in which the abovementioned problems do not occur or at least to a lesser extent.

According to the present invention, this object is achieved using a method for training a neural network for image transformation, comprising providing a vehicle, such as a car, on which are mounted a first camera and a second camera. The first camera and the second camera each have a same orientation relative to the vehicle and are arranged spaced apart in a default moving direction of the vehicle. For a car, the default moving direction corresponds to a direction in which the steering wheel is in an unturned position.

The first camera and the second camera are different from each other with respect to at least one property among the group of properties consisting of maximum pixel resolution, color gamut, use of color or polarization filters, camera manufacturer, camera model, and exposure settings. Within the context of the present invention, the first and second cameras are assumed to have identical properties when these cameras are from the same series and have the same model number. Put differently, process variations that are inevitable when manufacturing multiple cameras that are supposed to be identical, are not taken into account although the invention could be applied to those cameras as well.

The method according to the present invention further comprises allowing or controlling the vehicle to move along a trajectory. This trajectory may correspond to a predefined route through a given area. Such trajectories are often used when recording images for applications such as Google® Street View®.

According to the present invention, while moving along the trajectory, a recording operation is repeatedly performed for obtaining a dataset comprising a plurality of pairs of images, wherein each recording operation comprises triggering the first camera and the second camera at different time instants such that at a time or recording an image, the entrance pupil of the first camera and the entrance pupil of the second camera are at substantially the same position along the trajectory. Each pair of images comprises an image recorded by the first camera and an image recorded by the second camera during a given recording operation.

It should be noted that in some cases it is theoretically not possible to trigger the first camera and the second camera such that at a time of recording an image, the entrance pupils of those cameras are exactly at the same position in space. For example, the vehicle could make a turn or otherwise deviate from a straight path. In those cases, the triggering should be performed such that a difference between the positions of the entrance pupils at the times of recording the respective images is as small as possible. This particularly holds for a difference in position in a direction perpendicular to the optical axis of the first and second camera as this difference is strongly related to parallax phenomena.

According to the present invention, the obtained dataset is used for training a neural network, such as a convolutional neural network, to learn an image transformation for transforming an image of a scene recorded by the first camera into an image that mimics an image of the scene as it would have been recorded by the second camera.

With the method according to the invention, a large variety of different scenes may be imaged. Such large variety greatly improves the accuracy of the neural network. Recording the large variety is made possible by the combination of the mounting of the cameras, i.e. both cameras face the same direction for recording the same scene, and the particular triggering of these cameras, i.e. both cameras record an image from substantially the same position in space despite the vehicle being moving.

The method may further comprise upscaling a pixel resolution of images recorded by the first camera if these images have a lower pixel resolution than the images recorded by the second camera. Alternatively, the pixel resolution of images recorded by the second camera may be downscaled if these images have a higher pixel resolution than the images recorded by the first camera. Such upscaling or downscaling may be performed before using the dataset for training the neural network.

The method may further comprise performing an image registration for each pair of images in the dataset for geometrically aligning pixels in the image recorded by the first camera and pixels in the image recorded by the second camera.

For example, performing the image registration may comprise, for each pair of images, selecting one image in the pair of images as a source image and selecting the other image in the pair of images as a target image, determining a geometrical transformation for mapping the source image onto the target image using at least one of an intensity pattern comparison and an image feature comparison, and applying the determined geometrical transformation to the source image for obtaining a transformed source image.

The geometrical transformation may be determined by comparing the position of corresponding features in the images. For example, the position of a feature, such as a particular shape, color, or the like, may be determined in the source image and in the target image. The geometrical transformation should ensure that the position of corresponding features in the first and second images should be substantially identical. Instead of feature based comparison, the intensity patterns of the first and second image could be compared.

The method may further comprise determining at least one region in the transformed source image comprising pixels for which no corresponding pixels are present in the target image, and cropping and/or cutting the transformed source image to exclude the determined at least one region. The method may additionally comprise determining at least one region in the target image comprising pixels for which no corresponding pixels are present in the transformed source image, and cropping and/or cutting the target image to exclude the determined at least one region. The target image and the source image in the dataset can be replaced by the cropped/cut target image and the cropped/cut transformed source image, respectively. In this case, the method may further comprise upscaling or downscaling the cropped/cut target image and the cropped/cut transformed source image to a pixel resolution of the original source image or target image.

Alternatively, the method may further comprise determining at least one region in the transformed source image comprising pixels for which no corresponding pixels are present in the target image, and constructing a binary mask for the transformed source image. The binary mask comprises at least one region indicating pixels in the transformed source image that have corresponding pixels in the target image, and comprises at least one region indicating pixels in the transformed source image that have no corresponding pixels in the target image. In addition, the method may further comprise determining at least one region in the target image comprising pixels for which no corresponding pixels are present in the transformed source image, and constructing a binary mask for the target image. The binary mask comprises at least one region indicating pixels in the target image that have corresponding pixels in the transformed source image, and comprises at least one region indicating pixels in the target image that have no corresponding pixels in the transformed source image.

Furthermore, using the obtained dataset for training a neural network may comprise using the binary mask of the target image and the binary mask of the transformed source image to determine pixels in the target image and the transformed source image that are ignored when training the neural network.

Instead of modifying the target image and/or source image, the training of the neural network may comprise determining in the transformed source image of each pair of images provided to the neural network, pixels for which corresponding pixels exist in the target image of that pair of images, and when training the neural network, taking into account only those pixels in the transformed source images for which corresponding pixels have been found in the corresponding target images.

The second camera may be a lower resolution camera and the first camera a higher resolution camera, wherein images recorded by the first camera suffer from a parasitic light sensitivity problem and/or purple fringing. Parasitic Light Sensitivity (PLS) is a performance parameter, particularly for CMOS Image Sensors, which quantifies the sensor sensitivity to light when the shutter is supposedly closed. Purple fringing refers to an unfocused purple or magenta ghost image appearing in an image. Both these effects are more pronounced in high resolution cameras. The method according to the present invention allows these effects to be mitigated by appropriately training the neural network to perform a transformation on the images obtained with the first camera. More in particular, the dataset used for this training comprises high resolution images obtained using the first camera, which images display the abovementioned effects, and low resolution images obtained using the second camera, in which images the abovementioned effects are not present or at least to a lesser extent. The neural network is then trained to identify an image transformation that can be used on the images obtained by the first camera to remove the abovementioned effects. In this case, the high resolution images of the first camera may be downscaled prior to using these images in the training of the neural network.

A similar approach may be followed when the second camera uses a polarization filter when recording images, whereas the first camera does not. In this case, the neural network is trained to either apply a virtual polarization filter to the images recorded by the first camera, or to remove the effects of the virtual polarization filter from images recorded by the second camera.

According to a second aspect, the present invention provides a method for training a further neural network for recognizing an object, comprising using the method as described above for training a neural network to transform an image. The method further comprises providing a further dataset comprising a plurality of images recorded by the first camera and/or one or more cameras substantially identical to the first camera, transforming the images of the further dataset using the trained neural network, and training a further neural network for recognizing objects in an image recorded by the second camera or a camera substantially identical to the second camera using the transformed images of the further dataset.

Over time, large datasets are collected using the first camera and/or one or more cameras substantially identical to the first camera. For example, during a given period, vehicles on which the first camera(s) was/were mounted, were used for recording images for various applications. An example of such an application is object recognition. In this application, a further neural network is used for recognizing an object in an image. This further neural network has been trained using images recorded by the first camera and/or one or more cameras substantially identical to the first camera. The further neural network will display degraded performance when it is used for recognizing an object in an image recorded by the second camera or a camera substantially identical to the second camera. On the other hand, training the further neural network using images recorded by the second camera and/or one or more cameras substantially identical to the second camera may not be possible as sufficient images may not be available. According to the second aspect, the present invention addresses this problem by training a neural network to learn an image transformation for transforming an image of a scene recorded by the first camera into an image that mimics an image of the scene as it would have been recorded by the second camera, and to use this neural network to transform the further dataset that comprises images recorded by the first camera and/or one or more cameras substantially identical to the first camera. This transformed further dataset can then be used to train the further neural network. The further neural network trained in this manner will display improved performance when recognizing an object in an image recorded by the second camera or a camera substantially identical to the second camera.

According to a third aspect, the present invention provides a method for detecting an object in a first image, comprising using the method described above for training a neural network to transform an image. The method further comprises providing a further neural network for recognizing an object, wherein the further neural network has been trained using a dataset of images recorded by the second camera and/or by one or more cameras that are substantially identical to the second camera. In addition, the method comprises recording a first image using the first camera or a camera that is substantially identical to the first camera, transforming the first image using the trained neural network, and recognizing the object in the transformed first image using the trained further neural network.

BRIEF DESCRIPTION OF THE DRAWINGS

The terms Fig., Figs., Figure, and Figures are used interchangeably in the specification to refer to the corresponding figures in the drawings Next, the present invention will be described using the appended drawings, wherein.

DESCRIPTION OF THE INVENTION

Figure 1:
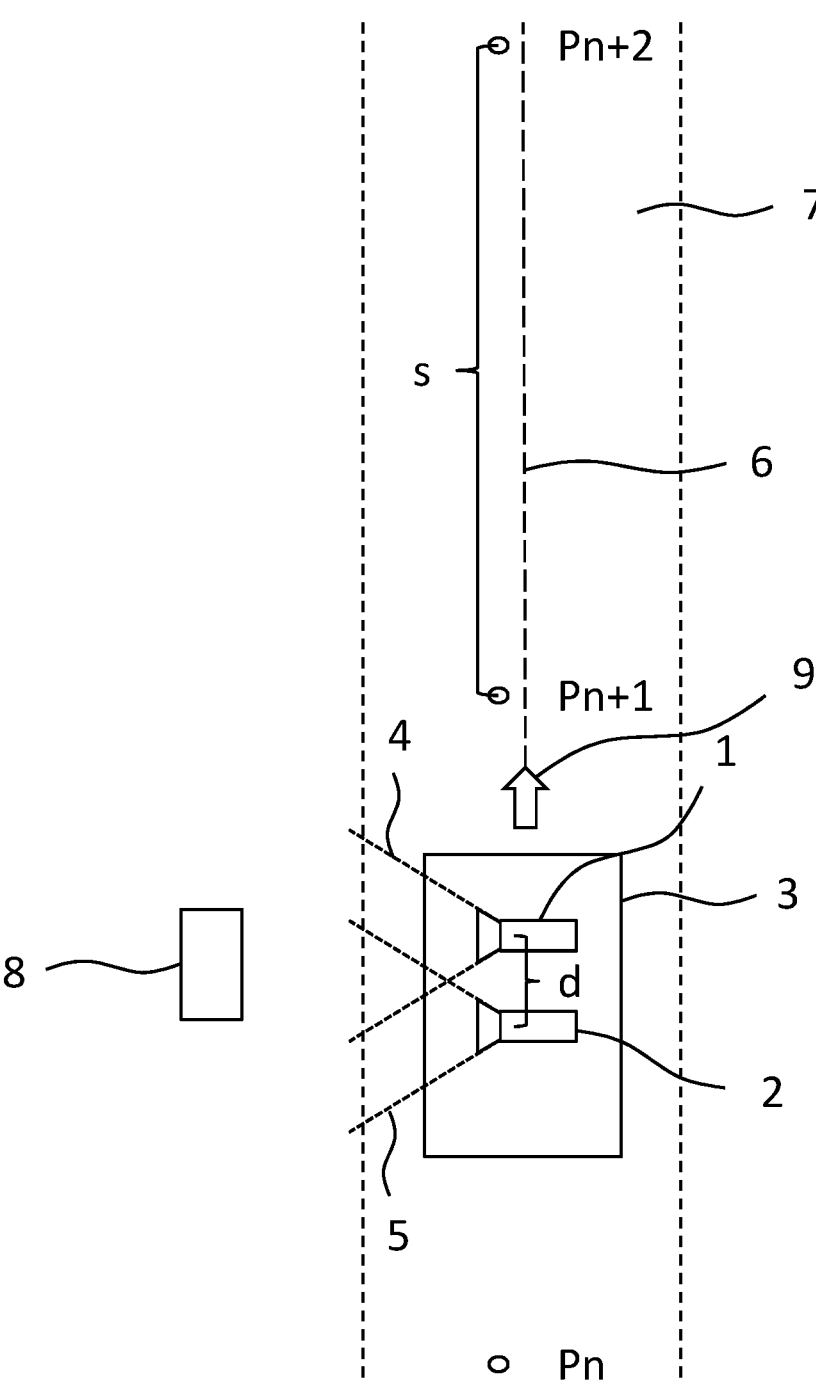
FIG. 1 illustrates a vehicle with a first and second camera mounted therein in accordance with the present invention.

FIG. 1 illustrates a vehicle 3 with a first camera 1 and a second camera 2 mounted on a roof of vehicle 3. Cameras 1, 2 are separated by a distance d in a direction that corresponds to a default moving direction 9 of vehicle 3. For example, vehicle 3 can be a car and default moving direction 9 corresponds to a straight ahead direction of vehicle 3.

First camera 1 is directed to the left of vehicle 3 and has a first field-of-view 4. Similarly, second camera 2 is also directed to the left of vehicle 3 and has a second field-of-view 5 which may or may not differ from field-of-view 4 at a time of recording an image.

Vehicle 3 moves along a trajectory 6 on a road 7. Along this trajectory, several positions Pn, Pn+1, Pn+2 are identified at which first camera 1 and second camera 2 are supposed to record an image. To this end, vehicle 1 may be equipped with a known positioning system that marks when first camera 1 reaches a particular position, e.g. Pn+1. Alternatively, first camera 1 may be triggered to record an image when vehicle 3 has traversed a given distance s relative to a position at which first camera 1 recorded a previous image. As such, the accuracy of the position Pn+1 is much less important than ensuring that first camera 1 and second camera 2 record an image at substantially the same position in space. When vehicle 3 moves with a constant velocity v, and an image was recorded by first camera 1 at time instant t0, second camera 2 will be triggered to record an image at time instant $t1=t0+d/v$.

By using the abovementioned triggering for first camera 1 and second camera 2 in combination with a substantially identical orientation of cameras 1, 2, images are obtained of substantially the same scene. This scene may for example comprise an object 8.

First camera 1 and second camera 2 are different cameras. More in particular, first camera 1 and second camera 2 are different from each other with respect to at least one property among the group of properties consisting of maximum pixel resolution, color gamut, use of color or polarization filters, camera manufacturer, camera model, and exposure settings.

Using vehicle 1, a dataset is obtained that comprises, for each of the M positions Pi, with i=1 . . . . M, a pair of images comprising an image recorded by first camera 1, and an image recorded by second camera 2.

Figure 2:
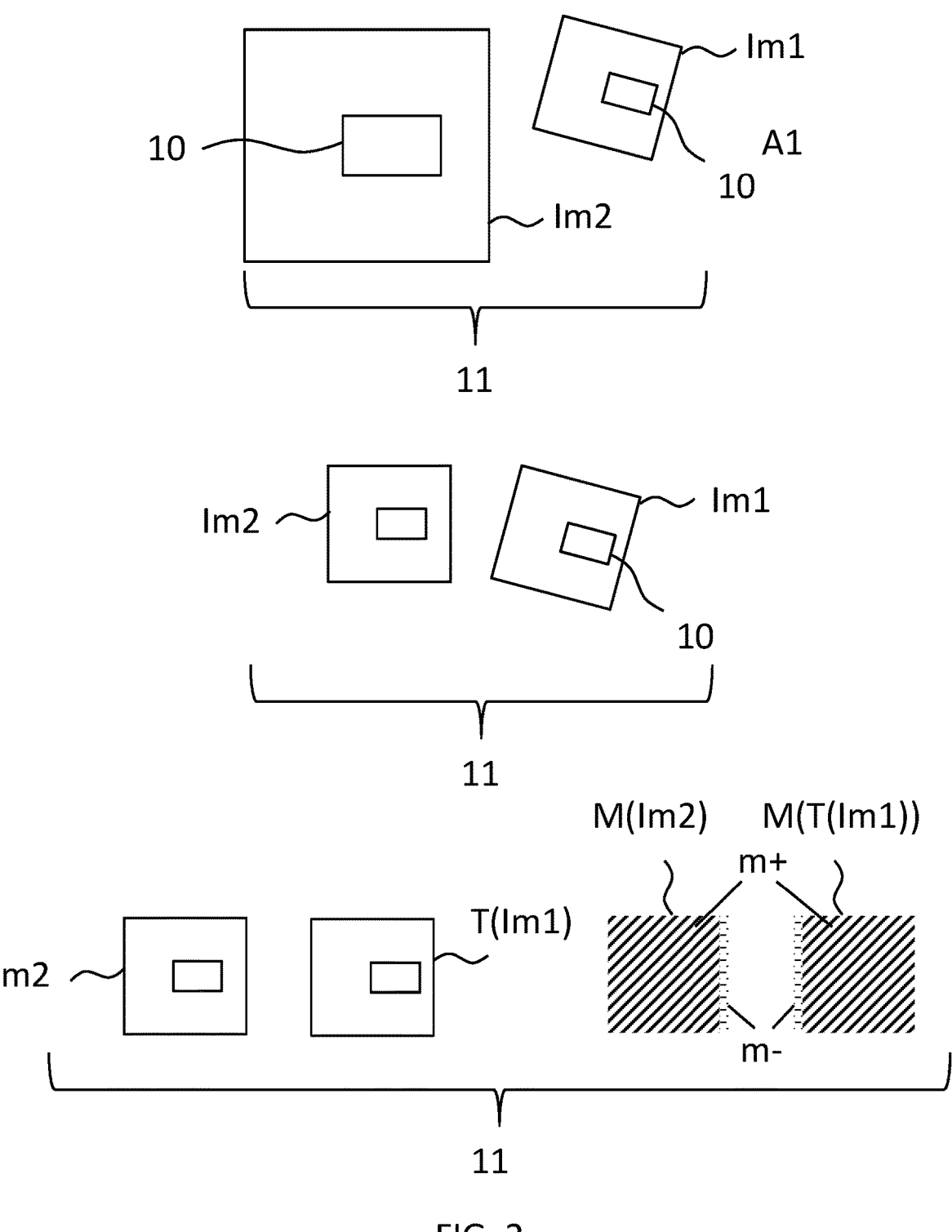
FIG. 2 illustrates several steps for constructing a dataset to be used for training a neural network in accordance with the present invention.

FIG. 2 illustrates several steps for constructing a dataset to be used for training a neural network in accordance with the present invention. Here, the dataset comprises a plurality of pairs 11 of images. In FIG. 2, a single pair 11 is indicated comprising an image Im1 recorded by first camera 1 and an image Im2 recorded by second camera 2. As shown, image Im1 has a lower pixel resolution than image Im2. Furthermore, in each of these images, a region 10 can be identified that corresponds to an object, e.g. object 8, in FIG. 1.

As shown in FIG. 2 top row, image Im1 and image Im2 may be geometrically misaligned. For example, images Im1, Im2 may have a mutual rotation and/or translation. For example, the relative position and rotation of region 10 in each of the images is different.

As a first step, a difference in pixel resolution of images Im1. Im2 may be reduced by upscaling or downscaling. In FIG. 2, center row, image Im2 has been downscaled using known methods.

As a next step, shown in the bottom row, image Im1 is subjected to a geometrical transformation for geometrically aligning images Im1, Im2. This transformed image is indicated by T(Im1). Despite this geometrical alignment, the position of region 10 in these images may not be exactly the same.

To address this problem, binary masks can be generated that can be used when training the neural network. For example, a binary mask M(Im2) can be generated for target image Im2. This binary mask has one or more regions m+ that comprise pixels that each have a respective corresponding pixel in transformed source image T(Im1). In addition, binary mask M(Im2) has one or more regions m− that comprise pixels that each do not have a respective corresponding pixel in transformed source image T(Im1). Similarly, a binary mask M(T(Im1)) can be generated for transformed source image T(Im1). This binary mask has one or more regions m+ that comprise pixels that each have a respective corresponding pixel in target image Im2. In addition, binary mask M(T(Im1)) has one or more regions m− that comprise pixels that each do not have a respective corresponding pixel in target image T(Im2). During the training of the neural network, binary masks M(T(Im1)) and M(Im2) can be used for determining which pixels to take or not to take into account.

Instead of using binary masks, the transformed source image (T(Im1)) and the target image (Im2) may be cropped and/or cut to exclude regions in these images in which pixels have no corresponding pixels in the other image. In this case, the source and target images in the dataset may be replaced by the cropped/cut counterparts.

Figure 3:
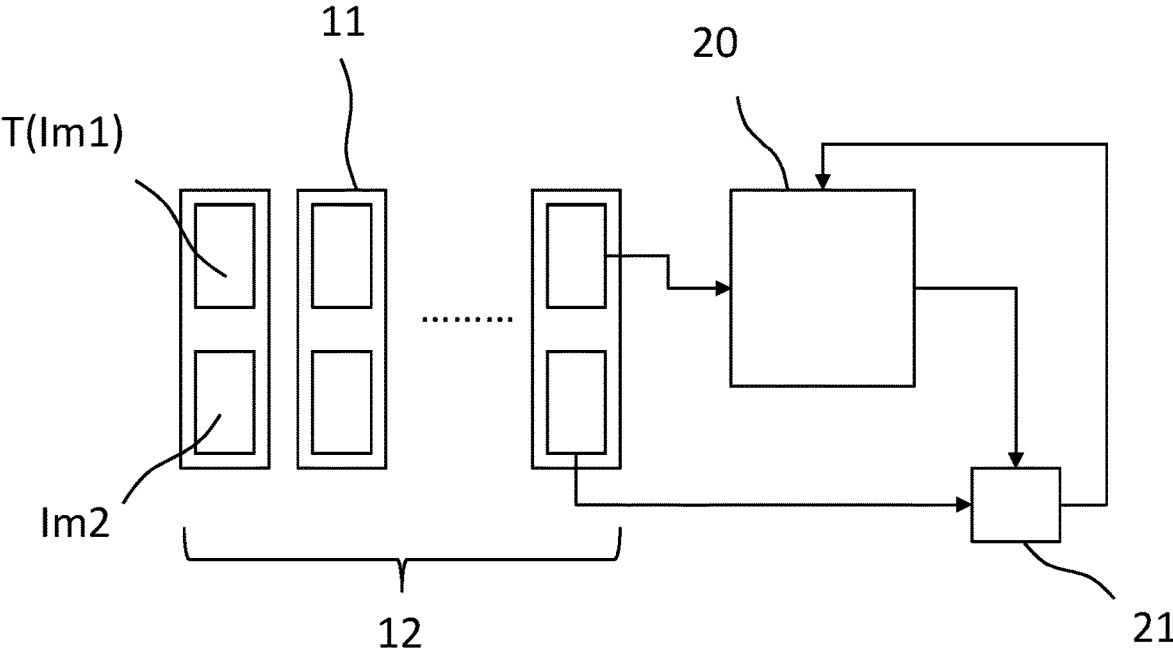
FIG. 3 illustrates the training of a neural network using the dataset constructed in FIG. 2 in accordance with the present invention.

FIG. 3 illustrates the training of a neural network 20 using a dataset 12 constructed in FIG. 2 in accordance with the present invention. FIG. 3 illustrates an example in which dataset 12 comprises a plurality of pairs 11 of images. Each pair 11 comprises an image T(Im1), and an image Im2 as discussed in connection in FIG. 3.

Dataset 12 is fed to a neural network 20 to train this network. More in particular, neural network 20 is trained such that images T(Im1) are transformed to mimic images Im2. To this end, a comparison is used, here indicated as being executed by a comparator 21, between images T(Im1) transformed by neural network 20 and the corresponding images Im2. The result of this comparison is used for training neural network 20. Comparator 21 can be embodied using a loss function for providing neural network feedback.

Figure 4A:
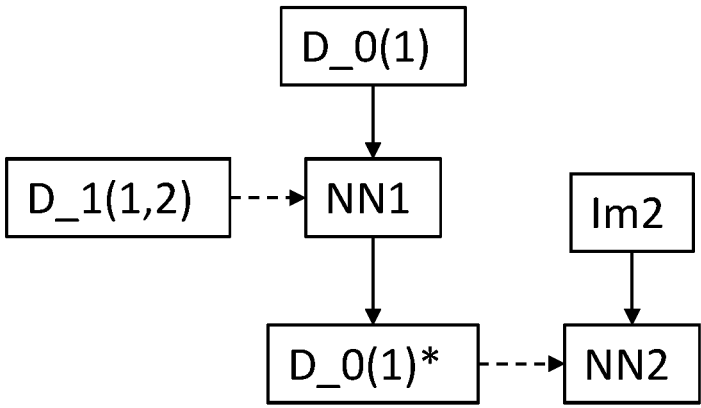
FIGS. 4A and 4B illustrate two different methods for recognizing an object in an image in accordance with the present invention.
Figure 4B:
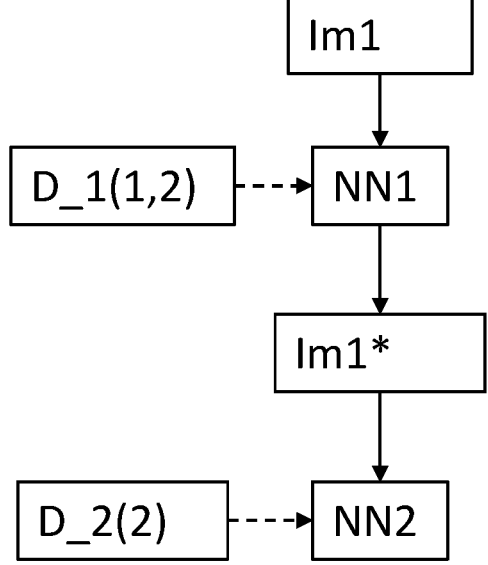

FIGS. 4A and 4B illustrate two different methods for recognizing an object in an image in accordance with the present invention.

FIG. 4A illustrates recognition of an object in an image Im2 recorded by the second camera 2 or a camera substantial identical to second camera 2 by a neural network NN2. This latter neural network is trained, as indicated by the dashed line, using a data set D_0(1)*.

Ideally, for training neural network NN2 images are used that are similar to image Im2. Hence, for training neural network NN2, ideally a large dataset of images recorded second camera 2 and/or one or more cameras substantially identical to second camera 2 is used. FIG. 4A address the problem that such dataset is not available. However, a dataset D_0(1) comprising images recorded by first camera 1 and/or one or more cameras substantial identical to first camera 2 is available. For example, first camera 1 may correspond to a well known and widely used camera, and second camera 2 may correspond to a novel camera having a higher resolution, different color gamut, etc.

As shown in FIG. 4A, the present invention proposes to use vehicle 1, on which a first camera 1 and second camera 2 are mounted, for recording a dataset D_1(1,2) that comprises a plurality of pairs of images, each pair of images comprising an image recorded by first camera 1, and an image recorded by second camera 2. This dataset may be modified as shown in FIG. 3. Furthermore, this dataset, either in original or modified form, is used for training neural network NN1.

After having trained neural network NN1, it is used for transforming images in dataset D_0(1) into a modified dataset D_0(1)*. This latter dataset mimics a dataset of images that would have been obtained using second camera 2. Furthermore, modified dataset D_0(1)* is used for training neural network NN2. Because it appears that the images of modified dataset D_0(1)* and image Im2 are recorded using the same or substantial identical camera, the performance of neural network NN2 for recognizing an object in an image recorded by second camera 2 or a camera substantially identical to second camera 2 is improved.

FIG. 4B illustrates an example wherein neural network NN2 for recognizing an object in an image is trained using a dataset D_2(2). This dataset comprises images that are recorded using second camera 2 and/or one or more cameras substantial identical to second camera 2.

Neural network NN2 is less suitable for recognizing an object in an image recorded by first camera 1. To address this problem, the present invention proposes to use vehicle 1, on which a first camera 1 and second camera 2 are mounted, for recording a dataset D_1(1,2) that comprises a plurality of pairs of images, each pair of images comprising an image recorded by first camera 1, and an image recorded by second camera 2. This dataset is used for training neural network NN1. This latter network is then used for transforming image Im1, recorded by first camera 1 or a camera substantially identical to first camera 1, into a modified image Im1*.

This modified image is then fed to neural network NN2 for recognizing an object therein.

The trained neutral network NN1 can be used for transforming images that suffer from unwanted effects. For example, first camera 1 may correspond to a low resolution camera, and second camera 2 may correspond to a high resolution camera that however suffers from a parasitic light sensitivity problem and/or purple fringing. In this case, neural network NN1 is trained such that an inputted image obtained by second camera 2 is transformed into an image that mimics an image that would have been obtained by first camera 1. Put differently, neural network NN1 is configured for removing the effects of purple fringing and/or the parasitic light sensitivity from an image obtained by second camera 2. In this case, for the purpose of training neural network NN1, the images obtained by first camera 1 may be up-scaled to the pixel resolution of the images obtained by second camera 2.

When recording images a problem may occur with reflecting windows, sun reflection, etc. These problems can be mitigated by using a polarization filter. However, having a polarization filter on a camera reduces the light intake, which may not be practical given the shutter times in combination with moving vehicle 3. This problem can be addressed by the present invention by using a second camera 2 and a first camera 1 that do and do not have a polarization filter, respectively. It is noted that second camera 2 and first camera 1 may be identical apart from whether the polarization filter is used. In this manner, neural network NN1 is trained to transform an image obtained using first camera 1 or a camera substantially identical to first camera 1 without polarization filter, to an image that mimics the image that would have been obtained by this camera if the polarization filter would have been used. A similar approach can be used when using color filters.

The present invention has been explained using detailed embodiments thereof. However, the present invention is not limited to these embodiments. Rather, various modifications are possible without deviating from the scope of the present invention, which is defined by the appended claims and their equivalents.

The invention claimed is:

1. A method for training a neural network for image transformation, comprising:
providing a vehicle on which are mounted a first camera and a second camera, the first camera and the second camera each having a same orientation relative to the vehicle and being arranged spaced apart by a distance d in a default moving direction of the vehicle, wherein the first camera and second camera are different from each other with respect to at least one property among the group of properties consisting of maximum pixel resolution, color gamut, use of color or polarization filters, camera manufacturer, camera model, and exposure settings;
allowing or controlling the vehicle to move along a trajectory;
while moving along the trajectory, repeatedly performing a recording operation for obtaining a dataset comprising a plurality of pairs of images, wherein each recording operation comprises triggering the first camera and the second camera at different time instants such that at a time of recording an image, the entrance pupil of the first camera and the entrance pupil of the second camera are at substantially the same position along the trajectory, wherein each pair of images comprises an image (Im1) recorded by the first camera and an image (Im2) recorded by the second camera during a given recording operation;
wherein for the purpose of recording an image by the first camera and the second camera such that the entrance pupils of those cameras are at substantially the same position at the time of recording the respective images, triggering of a camera among the first camera and second camera of which the entrance pupil reaches said same position the later is delayed by an amount that is equal to the distance d between the first camera and second camera in the default moving direction divided by the velocity v of the vehicle relative to the triggering of another camera among the first camera and second camera; and
using the obtained dataset for training a neural network to learn an image transformation for transforming an image of a scene recorded by the first camera into an image that mimics an image of the scene as it would have been recorded by the second camera.

2. The method according to claim 1, further comprising upscaling the pixel resolution of images (Im1) recorded by the first camera if these images (Im1) have a lower pixel resolution than the images (Im2) recorded by the second camera or downscaling the pixel resolution of images (Im2) recorded by the second camera if these images (Im2) have a higher pixel resolution than the images (Im1) recorded by the first camera.

3. The method according to claim 1, further comprising performing an image registration for each pair of images in the dataset for geometrically aligning pixels in the image (Im1) recorded by the first camera and pixels in the image (Im2) recorded by the second camera before using the dataset for training the neural network.

4. The method according to claim 3, wherein performing the image registration comprises, for each pair of images:
selecting one image (Im1) in the pair of images as a source image and selecting the other image (Im2) in the pair of images as a target image;
determining a geometrical transformation for mapping the source image (Im1) onto the target image (Im2) using at least one of an intensity pattern comparison and an image feature comparison; and
applying the determined geometrical transformation to the source image (Im1) for obtaining a transformed source image (T(Im1)).

5. The method according to claim 4, further comprising:
determining at least one region in the transformed source image (T(Im1)) comprising pixels for which no corresponding pixels are present in the target image (Im2), and cropping and/or cutting the transformed source image (T(Im1)) to exclude the determined at least one region;
determining at least one region in the target image (Im2) comprising pixels for which no corresponding pixels are present in the transformed source image (T(Im1)), and cropping and/or cutting the target image (Im2) to exclude the determined at least one region; and
replacing the target image (Im2) with the cropped/cut target image and replacing the source image (Im1) with the cropped/cut transformed source image (T(Im1)).

6. The method according to claim 5, further comprising upscaling or downscaling the cropped/cut target image (Im2) and the cropped/cut transformed source image (T(Im1)) to a pixel resolution of the original source image (Im1) or target image (Im2).

7. The method according to claim 4, further comprising:

determining at least one region in the transformed source image (T(Im1)) comprising pixels for which no corresponding pixels are present in the target image (Im2), and constructing a binary mask (M(T(Im1))) for the transformed source image (T(Im1)), said binary mask (M(T(Im1))) comprising at least one region (m+) indicating pixels in the transformed source image (T (Im1)) that have corresponding pixels in the target image (Im2), and comprising at least one region (m−) indicating pixels in the transformed source image (T(Im1)) that have no corresponding pixels in the target image (Im2);

determining at least one region in the target image (Im2) comprising pixels for which no corresponding pixels are present in the transformed source image (T(Im1)), and constructing a binary mask (M(Im2)) for the target image (Im2), said binary mask (M(Im2)) comprising at least one region (m+) indicating pixels in the target image (Im2) that have corresponding pixels in the transformed source image (T (Im1)), and comprising at least one region (m−) indicating pixels in the target image (Im2) that have no corresponding pixels in the transformed source image (T(Im1)).

8. The method according to claim 7, wherein said using the obtained dataset for training a neural network comprises using the binary mask (M(Im2)) of the target image (Im2) and the binary mask (M(T(Im1))) of the transformed source image (T(Im1)) to determine pixels in the target image (Im2) and the transformed source image (T(Im1)) that are ignored when training the neural network.

9. The method according to claim 4, wherein the training of the neural network comprises:

determining in the transformed source image (T(Im1)) of each pair of images provided to the neural network, pixels for which corresponding pixels exist in the target image (Im2) of that pair of images; and when training the neural network, taking into account only those pixels in the transformed source images (T(Im1)) for which corresponding pixels have been found in the corresponding target images (Im2).

10. The method according to claim 1, wherein the second camera is a lower resolution camera and the first camera a higher resolution camera, wherein images recorded by the first camera suffer from a parasitic light sensitivity problem and/or purple fringing.

11. The method according to claim 1, wherein the second camera uses a polarization filter when recording images.

12. The method according to claim 1, further comprising:

recording a first image using the first camera or a camera substantially identical to the first camera, and transforming the first image using the trained neural network.

13. A method for training a further neural network (NN2) for recognizing an object, comprising:

using the method of claim 1 for training a neural network (NN1) to transform an image;

providing a further dataset (D_0(1)) comprising a plurality of images recorded by the first camera and/or one or more cameras substantially identical to the first camera;

transforming the images of the further dataset (D_0(1)) using the trained neural network (NN1);

training a further neural network (NN2) for recognizing objects in an image (Im2) recorded by the second camera or a camera substantially identical to the second camera using the transformed images of the further dataset (D_0(1)*).

14. A method for detecting an object in a second image using a further neural network (NN2), comprising:

training the further neural network (NN2) according to claim 13;

recording a second image (Im2) by the second camera or a camera that is substantially identical to the second camera;

recognizing the object in the second image (Im2) using the trained further neural network (NN2).

15. A method for detecting an object in a first image (Im1), comprising:

using the method of claim 1 for training a neural network (NN1) to transform an image;

providing a further neural network (NN2) for recognizing an object that has been trained using a dataset (D_2(2)) of images recorded by the second camera and/or by one or more cameras that are substantially identical to the second camera;

recording a first image (Im1) using the first camera;

transforming the first image (Im1) using the trained neural network (NN1);

recognizing the object in the transformed first image (Im1*) using the trained further neural network (NN2).

* * * * *